United States Patent
Bao et al.

(10) Patent No.: US 9,467,537 B2
(45) Date of Patent: Oct. 11, 2016

(54) METHOD AND APPARATUS FOR TRANSMITTING AND RECEIVING DATA

(75) Inventors: Dongshan Bao, Beijing (CN); Desheng Yan, Beijing (CN); Shenfa Liu, Beijing (CN); Xiaoqiang Xie, Beijing (CN); Yubao Zhou, Beijing (CN); Huijuan Yao, Beijing (CN); Zhizuo Yang, Beijing (CN); Chaonan Peng, Beijing (CN); Min Ren, Beijing (CN); Jing Wang, Beijing (CN); Junhua Qin, Beijing (CN)

(73) Assignee: GUANGDONG NUFRONT COMPUTER SYSTEM CHIP CO., LTD., Guangzhou (CN)

( * ) Notice: Subject to any disclaimer, the term of this patent is extended or adjusted under 35 U.S.C. 154(b) by 4 days.

(21) Appl. No.: 14/376,785

(22) PCT Filed: Mar. 23, 2012

(86) PCT No.: PCT/CN2012/072882
§ 371 (c)(1),
(2), (4) Date: Aug. 5, 2014

(87) PCT Pub. No.: WO2013/117030
PCT Pub. Date: Aug. 15, 2013

(65) Prior Publication Data
US 2015/0010019 A1    Jan. 8, 2015

(30) Foreign Application Priority Data

Feb. 7, 2012   (CN) ............ 2012 1 0026596
Feb. 15, 2012  (CN) ............ 2012 1 0034331
Mar. 2, 2012   (CN) ............ 2012 1 0054116

(51) Int. Cl.
*H04L 29/06* (2006.01)
*H04L 29/08* (2006.01)

(52) U.S. Cl.
CPC ............ *H04L 69/22* (2013.01); *H04L 69/166* (2013.01); *H04L 69/30* (2013.01); *H04L 69/324* (2013.01); *H04L 2212/00* (2013.01)

(58) Field of Classification Search
CPC ....................................... H04L 69/22
USPC ......................................... 370/474
See application file for complete search history.

(56) References Cited

U.S. PATENT DOCUMENTS

| 2003/0086404 A1* | 5/2003 | Beckmann | ............ H04L 25/14 370/338 |
| 2004/0010653 A1* | 1/2004 | Grundy | ................. H04L 12/56 710/315 |

(Continued)

*Primary Examiner* — Mark Rinehart
*Assistant Examiner* — Peter Solinsky
(74) *Attorney, Agent, or Firm* — Anova Law Group, PLLC

(57) ABSTRACT

A method and apparatus for transmitting and receiving data are disclosed. The method for transmitting data, comprising encapsulating one or multiple media access control protocol data units (MPDU) as a group media access control protocol data unit (G-MPDU) based on a length of the group media access control protocol data unit G-MPDU; fragmenting a current MPDU according to a residual length to obtain a fragmented MPDU when the residual length is insufficient to encapsulate the current MPDU; encapsulating the fragmented MPDU to the G-MPDU; and transmitting the encapsulated G-MPDU. The method ensures a high data transmission rate and does not wasting excess time to execute the fragmentation processing. The method also ensures a high resource utilization rate, utilizing fully the remaining length of the data unit.

20 Claims, 3 Drawing Sheets

(56) References Cited

U.S. PATENT DOCUMENTS

| | | | |
|---|---|---|---|
| 2005/0114489 A1* | 5/2005 | Yonge, III | H04L 1/0061 709/223 |
| 2006/0067324 A1* | 3/2006 | Kim | H04W 76/022 370/395.2 |
| 2006/0251027 A1* | 11/2006 | Chun | H04W 74/004 370/335 |
| 2007/0047575 A1* | 3/2007 | Cui | H04L 12/4633 370/465 |
| 2007/0263568 A1* | 11/2007 | Kim | H04W 28/065 370/331 |
| 2008/0170531 A1* | 7/2008 | Petry | H04L 65/601 370/312 |
| 2009/0040977 A1* | 2/2009 | Lee | H04W 72/1257 370/329 |
| 2009/0086708 A1* | 4/2009 | Pani | H04W 28/065 370/349 |
| 2009/0141670 A1* | 6/2009 | Duncan Ho | H04W 28/06 370/328 |
| 2009/0252179 A1* | 10/2009 | Sultan | H04L 12/4625 370/470 |
| 2011/0080873 A1* | 4/2011 | Zhang | H04W 12/02 370/328 |
| 2012/0044905 A1* | 2/2012 | Kim | H04L 1/1854 370/329 |
| 2015/0201345 A1* | 7/2015 | Zhang | H04W 24/10 370/252 |

* cited by examiner

METHOD AND APPARATUS FOR TRANSMITTING AND RECEIVING DATA

CROSS-REFERENCE TO RELATED APPLICATION

Related Applications

This application claims the benefit of Chinese patent application No. 201210026596.3 filed on Feb. 7, 2012 and titled "Method and Apparatus for Data Transmission", which is incorporated herein by reference in its entirety.

This application claims the benefit of Chinese patent application No. 201210034331.8 filed on Feb. 15, 2012 and titled "Method and Apparatus for Transmitting and Receiving Data", which is incorporated herein by reference in its entirety.

This application claims the benefit of Chinese patent application No. 201210054116.4 filed on Mar. 2, 2012 and titled "Method and Apparatus for Transmitting and Receiving Data", which is incorporated herein by reference in its entirety.

FIELD OF THE INVENTION

The present disclosure relates to the field of wireless communication, especially relates to a method and apparatus for transmitting data and receiving.

BACKGROUND OF THE INVENTION 802.11 system provides two methods for data transmission. One is MPDU aggregation, encapsulated to A-MPDU for transmitting. When MPDU to be transmitted is too long, or the channel condition is bad, it may cause failure in MPDU transmitting, to avoid the oversize data volume for re-transmission, a second method is used to carry out fragmentation of MPDU, and use the form of small fragmentation to transmit the data to the opposite terminal When the A-MPDU aggregation is used, said MPDU is the integral MPDU. When the fragmentation is used for transmitting, the fragmentation must be transmitted in single frame, not in the form of A-MPDU. The execution of the fragmentation process may also consume system resource, so the data transmission rate is relatively low, and the overall output of the system is low. Under the 802.16 system, the size negotiation of fragmentation needs the additional signaling overhead. If the fragmentation size is the same during one transmission, the efficiency of the confirmation is relatively low.

It can be seen from the above that the current data transmission methods have certain disadvantages. It is necessary to seek better solutions when faced with high demand on the speed and resource utilization rate for data transmission.

SUMMARY OF THE INVENTION

The technical problem to be solved in the present disclosure is to provide a method and apparatus for transmitting and receiving data. The method needs to achieve a high data transmission speed, not wasting too much time for execution of the fragmentation processing, and to ensure a high resource utilization rate. The method makes use of the residue length, thus not to cause waste of resources.

One aspect of the present disclosure provides a method for transmitting data. The method includes encapsulating one or multiple media access control protocol data units (MPDU) as a group media access control protocol data unit (G-MPDU) based on a length of the group media access control protocol data unit G-MPDU; fragmenting a current MPDU according to a residual length to obtain a fragmented MPDU when the residual length is insufficient to encapsulate the current MPDU; encapsulating the fragmented MPDU to the G-MPDU; and transmitting the encapsulated G-MPDU.

Another aspect of the present disclosure provides a method for receiving data. The method includes receiving and analyzing a group media access control protocol data unit G-MPDU, wherein the G-MPDU includes one or multiple sub-frames; one MPDU is encapsulated in each sub-frame; and the MPDU could be either a fragmented MPDU or a non-fragmented MPDU; and restructuring the fragmented MPDU with a same sequence number.

Another aspect of the present disclosure provides an apparatus for transmitting data. The apparatus includes an encapsulating module configured to encapsulate one or multiple media access control protocol data units MPDU to G-MPDU according to the length of the group media access control protocol data unit G-MPDU; When the residual length is insufficient to encapsulate the current MPDU, fragmenting the current MPDU on the basis of said residual length to obtain the fragmented MPDU; encapsulate said fragmented MPDU to said G-MPDU; and a transmitting module configured to transmit the encapsulated G-MPDU.

Another aspect of the present disclosure provides an apparatus for receiving data. The apparatus includes a receiving & analyzing module configured to receive and analyze the group media access control protocol data unit G-MPDU; wherein the G-MPDU includes one or multiple sub-frames, one MPDU is encapsulated in each sub-frame, and said MPDU is a fragmented MPDU or a non-fragmented MPDU; and a processing module configured to restructure the analyzed fragmented MPDU with a same sequence number.

The method and apparatus for transmitting and receiving data provided in the present disclosure ensure a high data transmission rate and do not wasting excess time to execute the fragmentation processing. The method and apparatus also ensure a high resource utilization rate, utilizes fully the remaining length of a data unit.

DETAILED DESCRIPTION OF THE INVENTION

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part of and a certain feature of some embodiments may be included in or replaced by a part of and a certain feature of other embodiment. The scope of the embodiment of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended certainly to limit the application scope to any individual invention or inventive concept.

Figure 1:
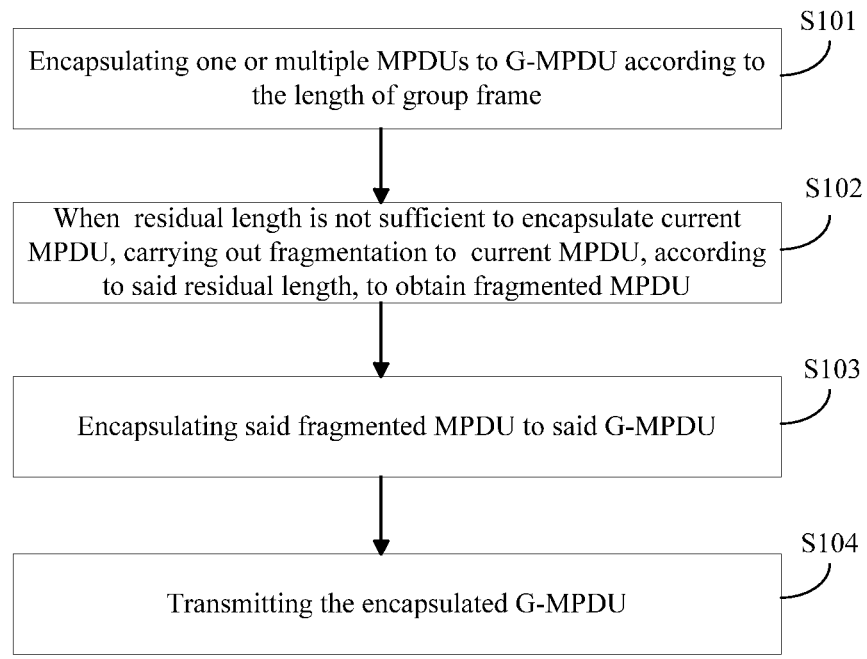
FIG. 1 is flow chart of a method for data transmission in one embodiment of the present disclosure.

Embodiments of the present disclosure provide a method for transmitting data. As shown in FIG. 1, the method includes the following steps.

Step S101: Encapsulating one or multiple media access control protocol data units (MPDU) to the group media access control protocol data unit (G-MPDU) according to the length of the group frame. Step S102: When the residual length is insufficient to encapsulate the current MPDU, carrying out fragmentation to the current MPDU according to said residual length, to obtain the fragmented MPDU. Step S103: Encapsulating said fragmented MPDU to said G-MPDU. Step S104: Transmitting the encapsulated G-MPDU.

Figure 2:
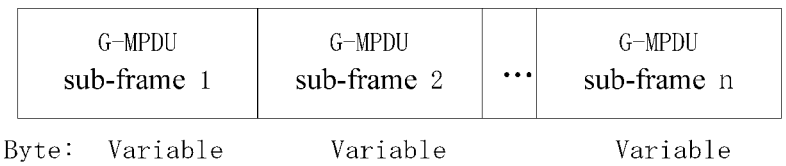
FIG. 2 is the illustration of the structure of G-MPDU in one embodiment of the present disclosure.

The structure of the encapsulated G-MPDU is shown in FIG. 2. The structure includes one or multiple sub-frames, and each MPDU is encapsulated in each sub-frame. Said MPDU may be either the non-fragmented MPDU, or the fragmented MPDU.

The above method for transmitting data provided in the embodiment of the present disclosure provides a method for G-MPDU encapsulation. When the available length is sufficient, the execution of the fragmentation processing is not needed, the method includes directly encapsulating the non-fragmented MPDU and thus improving the processing efficiency to ensure the relatively high processing speed. When the residual length of G-MPDU is not sufficient to encapsulate the current MPDU, execution of the fragmentation processing is needed, and the method may use the fragmented MPDU to fill said residual length. In this way, methods consistent with the present disclosure not only ensure the relatively high data transmission speed, not wasting too much time for execution of fragmentation processing, but also ensure the relatively high resource utilization rate, making best use of said residual length.

The length of said G-MPDU is determined by the current assigned transmission resource. While executing Step S101, the method includes first encapsulating the remaining non-fragmented MPDU into G-MPDU. This enables the receiving terminal to obtain all the non-fragmented MPDUs of the same sequence number in time and complete the restructuring in time.

Optionally, the method includes encapsulating each MPDU to G-MPDU in turn according to a sequence number (SN) of the MPDU. When the residual length is not enough for encapsulating the current MPDU, the method includes executing fragmentation to said MPDU and encapsulating the fragmentation in proper length. The method thus and makes best use of the residual length. Correspondingly, in case of encapsulating the next G-MPDU, the first to be encapsulated will be the residual fragmentation of the last encapsulated MPDU in the previous G-MPDU. The scheme for encapsulation of MPDU according to SN makes the processing at the receiving terminal easier. Methods consistent with the present disclosure thus reduce the requirement of the receiving terminal. This is especially useful in the scenario with relatively low capacity receiving terminals.

Optionally, the method includes encapsulating each MPDU to G-MPDU according to the sequence of MPDU in the buffer window of the transmitting terminal. Duplicative data transmissions may change the order of the MPDUs in the transmitting window. For example, the order may be MPDU1, MPDU2, MPDU3, MPDU4, MPDU1 (re-transmission of MPDU1 needed). When encapsulating G-MPDU according to the sequence of MPDU in the buffer window of the transmitting terminal, the encapsulation does not need to use the sequence according to SN. This reduces the requirement on the transmitting terminal, which may be especially applicable to the scenario with relatively low capacity transmitting terminals.

The present disclosure has no requirements of length of each MPDU, each MPDU could be a variable length frame, and the overall length of G-MPDU is determined according to the currently assigned transmission resource. Methods consistent with the present disclosure thus can be commonly used, flexible to implement, and can provide high resource utilization rate and high data transmission efficiency.

The method for transmitting data in the present disclosure is described below with specific examples. For instance, if the length of G-MPUD is just enough to encapsulate MPDU1 to MPDU5, the encapsulated G-MPDU includes 5 sub-frames, and said 5 sub-frames encapsulate MPDU1 to MPDU5 in turn. Said MPDU1 to MPDU5 are all non-fragmented MPDUs.

In another instance, the length of G-MPUD has residual after encapsulating MPDU1 to MPDU5, but the residual length is not sufficient to encapsulate MPDU6. The method consistent with the present disclosure includes carrying out fragmentation over MPDU6 according to the residual length to obtain two fragmented MPDUs. The two fragmented MPDUs are called MPDU61 and MPDU62, both of which having the same SN number. The method further includes encapsulating MPDU1 to MPDU5 as well as MPDU61, which is matched with the residual length, to G-MPUD. Said G-MPDU includes 6 sub-frames, and said 6 sub-frames encapsulate MPDU1, MPDU2, MPDU3, MPDU4, MPDU5 and MPDU61 in turn. Wherein, said MPDU1 to MPDU5 are non-fragmented MPDUs; MPDU61 is the fragmented MPDU.

The first encapsulated MPDU may be either one non-fragmented MPDU, or one fragmented MPDU (for instance, if the last to be encapsulated is MPDU61 in case of the previous encapsulation of G-MPDU, the first to be encapsulated would be MPDU62 for the next encapsulation of G-MPDU).

Because either the non-fragmented MPDU or the fragmented MPDU may be encapsulated in G-MPDU in the present disclosure, the method consistent with the present disclosure sets a fragmentation number for said fragmented MPDU, enabling the opposite terminal to recover the non-fragmented MPDU through restructuring. Optionally, fragmentation indication could be set for the fragmented MPDU. Optionally, said fragmentation indication is used for indicating whether there is a fragmentation of current MPDU afterward, thus to not only indicate whether the current MPDU is the fragmented MPDU through the indication bit, but also indicate whether said fragmented MPDU is the last fragmentation.

Figure 3:
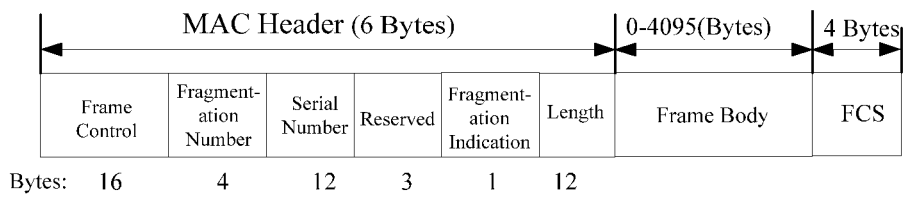
FIG. 3 is the illustration of the structure of MPDU in one embodiment of the present disclosure.
Figure 4:
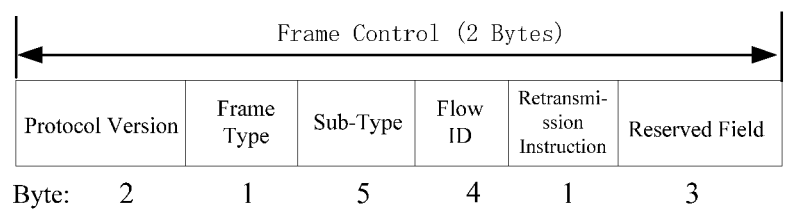
FIG. 4 is the illustration of the structure of frame header in one embodiment of the present disclosure.

The embodiment of the present disclosure provides a structure of MPDU, as shown in FIG. 3, including a frame header, a frame body and a frame check sequence (FCS). The frame header, as shown in FIG. 3, includes the frame control information, a fragmentation number, a sequence number, a reserved field, and a fragmentation indication and length. The frame control information, as shown in FIG. 4, including a protocol version, a frame type, a sub-type, a flow identification, a re-transmission instruction and reserved field.

Further, the frame type includes management control and data. Said sub-type is the detailed explanation of the frame type, as shown in Table 1 below.

(FSN) indicates the number of each fragmentation in MPDU of the same sequence. Said sequence number (SN) indicates the number of each MPDU. Said fragmentation indication indicates whether there is fragmentation of the current MPDU afterward. Said fragmentation length indicates the total byte length of all the fields between MAC-heading fields and FCS fields.

In the case of encapsulating G-MPDU, through the setting of the fields in the above MPDU, the receiving terminal can be informed about whether the MPDU encapsulated in each sub-frame of G-MPDU is fragmented or not, as well as the fragmentation number of the fragmented MPDU.

In the case of encapsulating G-MPDU, the method consistent with the present disclosure may encapsulate each MPDU to the sub-frame of G-MPDU, and one or multiple

TABLE 1

Effective type and combination of sub-type

| Type b2 | Type description | Value of sub-type b7 b6 b5 b4 b3 | Description of sub-type |
|---|---|---|---|
| 0 | Management Control | 00000 | Broadcast information frame (BCF) |
| | | 00001 | Random access request frame (RA_REQ) |
| | | 00010 | Random access response frame (RA_RSP) |
| | | 00011 | Terminal basic capacity negotiation request frame (SBC_REQ) |
| | | 00100 | Terminal basic capacity negotiation response frame (SBC_RSP) |
| | | 00101 | Dynamic service establishment request frame (DSA_REQ) |
| | | 00110 | Dynamic service establishment response frame (DSA_RSP) |
| | | 00111 | Dynamic service correction request frame (DSC_REQ) |
| | | 01000 | Dynamic service correction response frame (DSC_RSP) |
| | | 01001 | Dynamic service deletion request frame (DSD_REQ) |
| | | 01010 | Dynamic service deletion response frame (DSD_RSP) |
| | | 01011 | Independent resource request frame (RES_REQ) |
| | | 01100 | Multi-input multi-output feedback frame based on channel state information |
| | | 01101 | Channel quality feedback frame (CQI_FB) |
| | | 01110 | Reserve |
| | | 01111 | Feedback frame based on beamforming matrix (BFM_MIMO) |
| | | 10000 | Acknowledge frame (ACK) |
| | | 10001 | Group acknowledge request frame (GroupAckReq) |
| | | 10010 | Group acknowledge frame (GroupAck) |
| | | 10011 | Quit network frame (Quit) |
| | | 10100 | Channel switching information frame (CSW_INF) |
| | | 10101 | Sleep request frame (SLP_REQ) |
| | | 10110 | Sleep response frame (SLP_RSP) |
| | | 10111 | Downlink service indication frame (DTF_IND) |
| | | 11000~11111 | Reserve |
| 1 | Data | 00000 | Data frame (DATA) |
| | | 00001 | Data padding frame (PAD_DATA) |
| | | 00010~11111 | Reserve |

Said flow identification identifies the flow, including the management control flow and data flow. The data flow is divided into multiple data flows according to service type. Said re-transmission indication indicates whether it is the re-transmission data. For example, if the current frame is re-transmission of the previous frame, the field is set to 1; otherwise, set to 0. Said fragmentation sequence number said sub-frames constitute G-MPDU. Said MPDU may be either the non-fragmented MPDU, or the fragmented MPDU.

Figure 5:
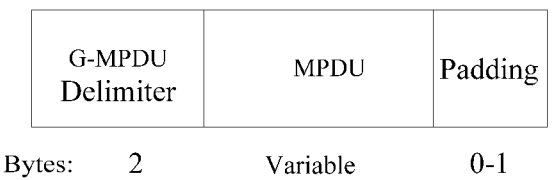
FIG. 5 is the illustration of the structure of frame control information in one embodiment of the present disclosure.
Figure 6:
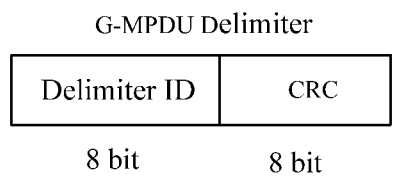
FIG. 6 is the illustration of the structure of delimiter in one embodiment of the present disclosure.

The step of encapsulating each MPDU to the sub-frame of G-MPDU, further includes setting the delimiter before said MPDU; and setting the padding bit after said MPDU to make the length of said sub-frame the integer multiples of 2 bytes. Note that for the last sub-frame in G-MPDU, the padding bit is not necessary. The sub-frame of encapsulated G-MPDU is shown in FIG. 5. The delimiter, as shown in FIG. 6, is composed of the delimiter identification and length check information.

Figure 7:
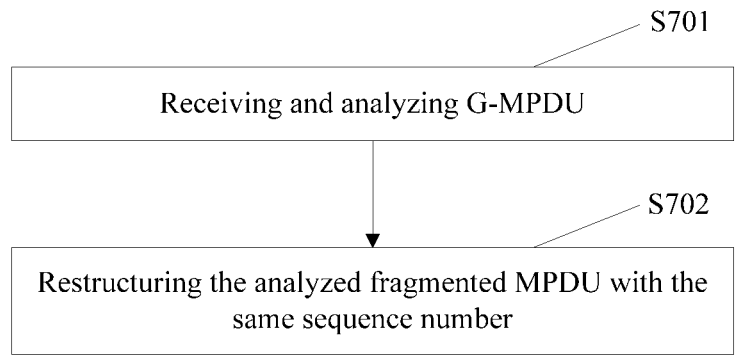
FIG. 7 is the flow chart of a method for receiving data in one embodiment of the present disclosure.

Correspondingly, the embodiment of the present disclosure also provides a method for receiving data, such as receiving G-MPDU transmitted by the above method, as shown in FIG. 7. The method includes the following steps.

Step S701: Receiving and analyzing G-MPDU. Said G-MPDU includes one or multiple sub-frames. One MPDU is encapsulated in each sub-frame. Said MPDU may be either the fragmented MPDU, or the non-fragmented MPDU.

Step S702: Restructuring the analyzed fragmented MPDU with the same sequence number. When the method for receiving data provided by the embodiment of the present disclosure is combined with the above method for transmitting data, embodiments of the present disclosure may analyze the transmitted G-MPDU and restructuring the obtained fragmented MPDU, thus recover the non-fragmented MPDU. Because the fragmentation is only executed when the residual length is not sufficient to encapsulate a complete MPDU in G-MPDU, during the analysis, most received data are the non-fragmented MPDUs. The transmitted data that need restructuring is limited, and the overall data transmission efficiency is very high.

In one example, methods consistent with the present disclosure may maintain the buffer window and fragmentation buffer corresponding to each service flow (FID), and execute the following steps after receiving the G-MPDU.

Step S801: after analysis of the MPDU, based on the flow identification FID, placing the non-fragmented MPDU into the buffer window corresponding to said FID; placing the fragmented MPDU into the fragmentation buffer corresponding to said FID; after the restructuring of the fragmented MPDU with the same sequence number and the recovering of the non-fragmented MPDU, placing it into said buffer window thereof.

Step S802: transmitting MPDU cached within said buffer window to the upper layer.

The specific rules for transmitting MPDU cached in said buffer window to the upper layer may be set according to the needs in each case. The present disclosure provides an example for explanation purposes, without limiting the scope of the present disclosure.

For instance, the buffer length of the buffer window corresponding to FID1 and FID2 may be 16, and the receiving terminal may receive 19 MPDUs, including:

MPDU1: FID=1, SN=1;
MPDU2: FID=1, SN=2;
MPDU16: FID=1, SN=16, FSN=0;
MPDU17: FID=1, SN=16, FSN=1;
MPDU18: FID=1, SN=17;
MPDU19: FID=2, SN=1.

Correspondingly, the method consistent with the present disclosure may place MPDU1 to MPDU15 in the buffer window corresponding to FID1 according to the SN, and place MPDU16 and MPDU17 in the fragmentation buffer corresponding to FID1 in turn. When MPDU17 reaches the fragmentation buffer corresponding to FID1, the fragmentations of MPDU with SN=16 is complete. The method includes restructuring of MPDU16 and MPDU17, and recovering the non-fragmented MPDU with SN=16. The method further includes placing said restructured MPDU in the buffer window corresponding to FID1. Because the buffer length of the buffer window corresponding to FID1 is 16, when placing said restructured MPDU in the buffer window corresponding to FID1, the window slides to transmit MPDU1 to the upper layer. Because the FID that MPDU18 corresponds to is equal to 2, the method includes further placing MPDU18 into the buffer window corresponding to FID2 according to the SN.

Optionally, Step S701 also includes restructuring of all the fragmented MPDU with the same sequence number in turn according to the fragmentation number, thus to recover the non-fragmented MPDU.

Optionally, Step S701 also includes confirming whether there is fragmentation of the current MPDU afterward according to the fragmentation indication information. It can not only confirm whether the current MPDU is the fragmented MPDU, but also confirm whether the current MPDU is the last fragmentation according to said fragmentation indication information.

Optionally, Step S701 also includes encapsulating delimiter in each sub-frame; locating the starting position of MPDU in the sub-frame according to said delimiter; and analyzing MPDU in the located sub-frame.

Optionally, Step S701 also includes obtaining the length of said MPDU after positioning the starting position of MPDU in the sub-frame, and locating the starting position of MPDU encapsulated in the next sub-frame through calculation, thus to realize the rapid analysis.

Optionally, Step S702 includes, when the residual length is not sufficient to encapsulate the current MPDU, first determining whether said residual length is larger than the preset minimum fragmentation length; if larger, executing the fragmentation of the current MPDU; otherwise, the fragmentation is not executed, and encapsulation of G-MPDU is completed. For balanced consideration of the physical transmission resources and the resources that service occupies, when the remaining physical transmission is too little, executing the fragmentation process is not cost-effective obviously. In this case, the method consistent with the present disclosure may abandon the use of the residual length to improve the overall resource utilization rate.

Figure 8:
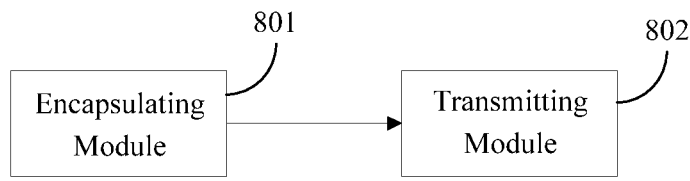
FIG. 8 is the block diagram of an apparatus for transmitting data in the embodiment of the present disclosure.

In order to realize the above method for transmitting data, the embodiment of the present disclosure also provides an apparatus for transmitting data, as shown in FIG. 8. The apparatus includes the following components.

An encapsulating module 801, for encapsulating one or multiple media access control protocol data units MPDU to G-MPDU according to the length of the group media access control protocol data unit G-MPDU. When the residual length is not sufficient to encapsulate the current MPDU, the encapsulating module 801 may carry out fragmentation to the current MPDU according to said residual length to obtain the fragmented MPDU and encapsulate said fragmented MPDU to said G-MPDU.

A transmitting module 802 transmits the encapsulated G-MPDU. Optionally, for said encapsulating module 801, when the residual length is not sufficient to encapsulate the current MPDU, it may first determine whether said residual length is larger than the preset minimum fragmentation length. If so, the encapsulating module 801 may execute the fragmentation to the current MPDU. Otherwise, the encapsulating module 801 may not execute the fragmentation process, and encapsulation of G-MPDU is complete.

In one embodiment, said encapsulating module 801, when encapsulating each MPDU to the sub-frame of G-MPDU, may execute the steps of setting the delimiter before said MPDU and setting the padding bit after said MPDU to make the length of said sub-frame the integer multiples of 2 bytes. Optionally, said delimiter is composed of the delimiter identification and length check information. Said encapsulating module 801, in case of encapsulating G-MPDU, takes precedence to encapsulate the fragmented MPDU. Further, said encapsulating module 801, also sets fragmentation number for said fragmented MPDU. Said encapsulating module 801, also sets fragmentation indication information for said fragmented MPDU.

The fragmentation indication information indicates there is fragmentation of the current MPDU afterward. The length of said G-MPDU is determined according to the currently assigned transmission resources.

Figure 9:
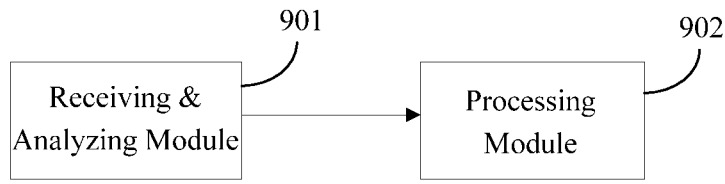
FIG. 9 is the block diagram of an apparatus for receiving data in one embodiment of the present disclosure.

In order to realize the above method for receiving data, the embodiment of the present disclosure also provides an apparatus for receiving data, as shown in FIG. 9. The apparatus includes the following components.

A receiving & analyzing module 901, which receives and analyzes the group media access control protocol data unit G-MPDU. The G-MPDU includes one or multiple sub-frames. One MPDU is encapsulated in each sub-frame. The MPDU is a fragmented MPDU or non-fragmented MPDU. A processing module 902, which carries out restructuring of the analyzed fragmented MPDU with the same sequence number.

In one embodiment, said processing module 902, based on the flow identification FID, places the non-fragmented MPDU into the buffer window corresponding to said FID after analyzing the MPDU by said receiving & analyzing module 901. The processing module 902 may place the fragmented MPDU into the fragmentation buffer corresponding to said FID, carry out the restructuring of the fragmented MPDU with the same sequence number, and place it into said buffer window after the non-fragmented MPDU is recovered. The processing module 902 may transmit the MPDU cached within said buffer window to the upper layer.

Optionally, said processing module 902, carries out restructuring of all the fragmented MPDU with the same sequence number in turn according to the fragmentation number, thus recovers the non-fragmented MPDU. Optionally, said processing module 902, used for confirming whether there is fragmentation of the current MPDU afterward according to the fragmentation indication information.

Optionally, the delimiter is encapsulated in each sub-frame. The receiving & analyzing module 901, may locate the starting position of MPDU in the sub-frame according to said delimiter, and analyze MPDU in the located sub-frame. Optionally, said receiving & analyzing module 901 obtains the length of said MPDU after locating the starting position of MPDU in the sub-frame, and locates the starting position of MPDU encapsulated in the next sub-frame through calculation.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for transmitting data, comprising:
encapsulating one or multiple media access control protocol data units (MPDU) as a group media access control protocol data unit (G-MPDU) based on a length of the group media access control protocol data unit G-MPDU;
when a residual length of the G-MPDU is insufficient to encapsulate a current MPDU, the residual length being the length of the G-MPDU subtracting a length of the one or multiple MPDUs encapsulated in the G-MPDU, determining whether the residual length is longer than a preset minimum fragmentation length;
when the residual length equals to or is shorter than the preset minimum fragmentation length, completing encapsulation of the G-MPDU, leaving the residual length of the G-MPDU empty;
when the residual length is longer than the preset minimum fragmentation length, fragmenting the current MPDU according to the residual length to obtain a fragmented MPDU;
encapsulating the fragmented MPDU to the G-MPDU; and
transmitting the encapsulated G-MPDU.

2. The method of claim 1, further comprising:
encapsulating a MPDU to a sub-frame of G-MPDU;
placing a delimiter before the MPDU; and
placing a padding bit after the MPDU to make a length of the sub-frame a multiple of 2 bytes,
wherein the sub-frame of G-MPDU is formed, in sequence, by the delimiter, the MPDU, and the padding bit.

3. The method of claim 2, wherein the delimiter includes a delimiter identification and length check information.

4. The method of claim 2, wherein:
each MPDU is sequentially formed of: a frame header, a frame body, and a frame check sequence;
the frame header is sequentially formed of: a frame control information, a fragmentation sequence number identifying a number of a fragmentation in a same sequence, a sequence number identifying a number of a MPDU, a reserved field, and a one-bit fragmentation indication information identifying whether a fragmentation of the current MPDU is expected afterwards, and a length information indicating a length between the frame header and the frame check sequence; and
the frame control information is sequentially formed of: a protocol version, a frame type indicating a management control data, a sub-type explaining the frame type in detail, a flow identification, a one-bit re-transmission instruction identifying whether the current MPDU is a re-transmission of a previous frame, and a reserved field.

5. The method of claim 1, further comprising:
encapsulating the fragmented MPDU before other MPDUs when encapsulating the G-MPDU.

6. The method of claim 1, further comprising:
determining a fragmentation number for said fragmented MPDU.

7. The method of claim 6, further comprising:
setting fragmentation indication information for said fragmented MPDU.

8. The method of claim 7, wherein the fragmentation indication information indicates whether there is more fragmentation of the current MPDU after itself.

9. The method of claim 1, wherein the length of said G-MPDU is determined based on currently assigned transmission resources.

10. A method for receiving data, comprising:
receiving and analyzing a plurality of group media access control protocol data units G-MPDUs, wherein:
each G-MPDU includes one or multiple sub-frames;
one MPDU is encapsulated in each sub-frame of the G-MPDU;
the MPDU could be either a fragmented MPDU or a non-fragmented MPDU;

when a last component of a G-MPDU is a sub-frame encapsulating a fragmented MPDU, a length of the fragmented MPDU is longer than a preset minimum fragmentation length; and when a last component of a G-MPDU is a residual, a length of the residual is the same or shorter than the preset minimum fragmentation length; and restructuring the fragmented MPDU with a same sequence number.

11. The method of claim 10, further comprising:
placing the non-fragmented MPDUs into a buffer window corresponding to a flow identification;
placing the fragmented MPDU into a fragmentation buffer corresponding to a flow identification;
restructuring the fragmented MPDU with the same sequence number;
recovering a non-fragmented MPDU from the restructured MPDU;
placing the recovered MPDU into the buffer window; and
transmitting MPDUs cached within the buffer window to an upper layer.

12. The method of claim 10, further comprising:
restructuring all fragmented MPDU with the same sequence number in turn of the fragmentation number; and
recovering a non-fragmented MPDU.

13. The method of claim 12, further comprising:
confirming whether there is more fragmentation of the current MPDU based on fragmentation indication information.

14. The method of claim 10, further comprising:
encapsulating a delimiter in each sub-frame, wherein the sub-frame is formed, in sequence, by the delimiter, the MPDU, and a padding bit to make a length of the sub-frame a multiple of 2 bytes;
locating a starting position of a MPDU in the sub-frame based on the delimiter; and
analyzing the MPDU in the located sub-frame.

15. The method of claim 14, further comprising:
obtaining a length of the MPDU after locating the starting position of the MPDU in the sub-frame; and
locating the starting position of a MPDU in the next sub-frame.

16. An apparatus for transmitting data, comprising:
an encapsulating module configured to:
encapsulate one or multiple media access control protocol data units (MPDUs) to a group media access control protocol data unit (G-MPDU) according to the length of the G-MPDU;
when a residual length of the G-MPDU is insufficient to encapsulate a current MPDU,
determine whether the residual length is longer than a preset minimum fragmentation length;
when the residual length equals to or is shorter than the preset minimum fragmentation length, completing encapsulation of the G-MPDU, leaving the residual length of the G-MPDU empty; and
when the residual length is longer than the preset minimum fragmentation length, fragment the current MPDU on the basis of the residual length to obtain a fragmented MPDU; and
encapsulate the fragmented MPDU to the G-MPDU; and
a transmitting module configured to transmit the encapsulated G-MPDU.

17. The apparatus of claim 16, wherein the encapsulating module is further configured to:
place a delimiter before the MPDU; and
place a padding bit after the MPDU to make a length of a sub-frame a multiple of 2 bytes;
wherein the sub-frame of G-MPDU is formed, in sequence, by the delimiter, the MPDU, and the padding bit.

18. The apparatus of claim 16, wherein the encapsulating module is further configured to encapsulate the fragmented MPDU before other MPDUs when encapsulating the G-MPDU.

19. An apparatus for receiving data, comprising:
a receiving and analyzing module configured to receive and analyze a plurality of group media access control protocol data units (G-MPDUs); wherein:
each G-MPDU includes one or multiple sub-frames;
one MPDU is encapsulated in each sub-frame of the G-MPDU;
a MPDU is a fragmented MPDU or a non-fragmented MPDU;
when a last component of a G-MPDU is a sub-frame encapsulating a fragmented MPDU, a length of the fragmented MPDU is longer than a preset minimum fragmentation length; and
when a last component of a G-MPDU is a residual, a length of the residual is shorter than the preset minimum fragmentation length; and
a processing module configured to restructure a fragmented MPDU with a same sequence number.

20. The apparatus of claim 19, wherein the processing module is further configured to:
place the non-fragmented MPDU into a buffer window corresponding to a flow identification;
place the fragmented MPDU into a fragmentation buffer corresponding to a flow identification;
restructure the fragmented MPDU with the same sequence number;
recover a non-fragmented MPDU from the restructured fragmented MPDU;
place the recovered MPDU into the buffer window; and
transmit MPDUs cached within the buffer window to an upper layer.

* * * * *